US012798324B2

(12) United States Patent
Liu et al.

(10) Patent No.: US 12,798,324 B2
(45) Date of Patent: Nov. 17, 2026

(54) METHOD FOR CONTROLLING AN AIR-CONDITIONING AND/OR HEATING SYSTEM

(71) Applicant: VALEO SYSTEMES THERMIQUES, La Verriere (FR)

(72) Inventors: Jinming Liu, La Verriere (FR); Mohamed Yahia, La Verriere (FR); Roland Akiki, La Verriere (FR); Bertrand Nicolas, La Verriere (FR); Stefan Karl, La Verriere (FR); Muriel Porto, La Verriere (FR)

(73) Assignee: Valeo Electrification, Cergy Pontoise (FR)

(*) Notice: Subject to any disclaimer, the term of this patent is extended or adjusted under 35 U.S.C. 154(b) by 289 days.

(21) Appl. No.: 18/293,197

(22) PCT Filed: Jul. 26, 2022

(86) PCT No.: PCT/EP2022/070978
§ 371 (c)(1),
(2) Date: Jan. 29, 2024

(87) PCT Pub. No.: WO2023/006768
PCT Pub. Date: Feb. 2, 2023

(65) Prior Publication Data

US 2025/0074135 A1 Mar. 6, 2025

(30) Foreign Application Priority Data

Jul. 29, 2021 (FR) ....................................... 2108240

(51) Int. Cl.
*B60H 1/00* (2006.01)
*B60H 1/32* (2006.01)

(52) U.S. Cl.
CPC ......... *B60H 1/0005* (2013.01); *B60H 1/0073* (2019.05); *B60H 1/00807* (2013.01);
(Continued)

(58) Field of Classification Search
None
See application file for complete search history.

(56) References Cited

U.S. PATENT DOCUMENTS

| | | | |
|---|---|---|---|
| 9,643,473 | B2 | 5/2017 | Kang et al. |
| 10,252,600 | B2 | 4/2019 | Miyakoshi et al. |

(Continued)

FOREIGN PATENT DOCUMENTS

| | | | |
|---|---|---|---|
| CN | 106470859 A | 3/2017 |
| CN | 111051092 A | 4/2020 |
| EP | 3785951 A1 | 3/2021 |
| FR | 3043762 A1 | 5/2017 |
| JP | 20160064704 A | 4/2016 |

OTHER PUBLICATIONS

Japan Patent Office, Office Action (with English translation) of corresponding Japanese Application No. 2024-505092, dated Apr. 1, 2025, 17 pages.

(Continued)

*Primary Examiner* — Ryan A Jarrett
(74) *Attorney, Agent, or Firm* — Valeo Electrification

(57) ABSTRACT

A method for controlling a system for air conditioning and/or heating, the system including a loop for the circulation of a refrigerant, with a first heat exchanger between the refrigerant and the inside air stream, a second heat exchanger between the refrigerant and the inside air stream or a heat transfer fluid, the method including selecting a mode for dehumidifying the inside air stream from a plurality of dehumidification modes, the selecting being implemented on the basis of maps, produced in advance, of at least humidity control parameters, selected from an actual temperature of the inside air stream upstream of the first heat (Continued)

exchanger, a temperature setpoint downstream of the second heat exchanger, a temperature setpoint downstream of the first exchanger, a flow rate of the inside air stream through the first exchanger, an ambient temperature of the air and/or a humidity of the air.

20 Claims, 7 Drawing Sheets

(52) U.S. Cl.
CPC ....... *B60H 1/00921* (2013.01); *B60H 1/3207* (2013.01); *B60H 1/32284* (2019.05); *B60H 2001/3241* (2013.01); *B60H 2001/3245* (2013.01); *B60H 2001/3255* (2013.01); *B60H 2001/3261* (2013.01)

(56) References Cited

U.S. PATENT DOCUMENTS

| | | | | |
|---|---|---|---|---|
| 10,616,504 | B2 | 4/2020 | Taketani | |
| 11,407,279 | B2 * | 8/2022 | Yamaguchi | B60H 1/00785 |

OTHER PUBLICATIONS

Japan Patent Office, Search Report (with English translation) of corresponding Japanese Application No. 2024-505092, dated Mar. 26, 2025, 32 pages.

European Patent Office, International Search Report (with English translation) and Written Opinion of corresponding International Application No. PCT/EP2022/070978, dated Oct. 31, 2022.

China Patent Office, Office Action (with English translation) and Search Report for corresponding Chinese Application No. 202280061789.4, dated Jun. 30, 2026, 15 pages.

* cited by examiner

METHOD FOR CONTROLLING AN AIR-CONDITIONING AND/OR HEATING SYSTEM

TECHNICAL FIELD

The invention relates to a method for controlling an air conditioning and/or heating system, in particular for a motor vehicle. The invention relates more particularly to controlling dehumidification in the passenger compartment of the motor vehicle by means of the aforementioned air conditioning and/or heating system.

BACKGROUND OF THE INVENTION

Motor vehicles are commonly provided with a thermal regulation circuit comprising a loop for the circulation of refrigerant used to heat or cool different zones or different components of the vehicle. It is known practice to use this circuit to thermally treat an air stream sent into the passenger compartment of the vehicle.

In vehicles provided with an internal combustion engine, the heat energy released by the engine is generally sufficient to heat the passenger compartment. This is not the case for hybrid or electric vehicles.

The use of thermal regulation circuits not only to air condition the passenger compartment of the vehicle, by operating in air conditioning mode, but also to heat it, by operating in heat pump mode, has therefore been proposed.

In addition to these conventional operating modes, it is also known practice to use the thermal regulations circuits in dehumidification mode to prevent the air introduced into the vehicle from being too humid, which is unpleasant for the occupants and might fog the windshield and windows. This operating mode is based on prior cooling of the air intended to enter the passenger compartment, in order to dry it, and then the heating of this air so that excessively cold air is not sent to the users of the vehicle. Different dehumidification modes are further known, and used as a function of the desired temperature in the passenger compartment.

The known heating and/or air conditioning systems conventionally comprise a loop for the circulation of a refrigerant comprising at least a first heat exchanger to cool the air stream and a second heat exchanger to heat said air stream. The temperature to which the air stream is cooled downstream of the first exchanger and the temperature to which it is heated downstream of the second exchanger are fixed by a setpoint, depending on the air temperature and humidity level desired in the passenger compartment of the vehicle.

In these air conditioning and/or heating systems, the air conditioning system or a part thereof is controlled by means of a computer the role of which is to determine, as a function of the air temperature desired in the passenger compartment, the most appropriate mode out of air conditioning mode, heat pump mode and the dehumidification mode(s).

If there is a plurality of dehumidification modes, the computer is capable of changing modes when the blown air is not the desired temperature. Due to the thermal inertia of the system, there is then a risk that the occupants will feel an air stream perceived as cold when they are expecting a hot air stream, or vice versa.

Such iterative regulation can be particularly slow and during this time, the users of the vehicle continue to feel uncomfortable. They will also tend to adjust the temperature requested, which will disrupt the operation of the system all the more.

SUMMARY OF THE INVENTION

The method according to the invention aims to achieve acceptably comfortable conditions for the users of the vehicle more quickly than the known methods. When one of the users requires a temperature change in the passenger compartment, the method of the invention makes it possible to select the appropriate dehumidification mode, or at least to approach the appropriate dehumidification mode more easily.

In this regard, the invention proposes a method for controlling a system for air conditioning and/or heating an inside air stream intended to be sent to a passenger compartment of a vehicle, said system comprising a loop for the circulation of a refrigerant, said loop comprising:

- a first heat exchanger between the refrigerant and the inside air stream for cooling said inside air stream,
- a second heat exchanger between the refrigerant and the inside air stream or a heat transfer fluid for heating said inside air stream, situated downstream of the first heat exchanger in the direction of circulation of the inside air stream,
- said method comprising at least one step of selecting a mode for dehumidifying the inside air stream from a plurality of dehumidification modes, said selection step being implemented on the basis of maps, produced in advance, of at least three parameters of the system, referred to as humidity control parameters, selected from an actual temperature of the inside air stream upstream of the first heat exchanger, a temperature setpoint downstream of the second heat exchanger, a temperature setpoint downstream of the first exchanger, a flow rate of said inside air stream through the first exchanger, an ambient temperature of the air and/or a humidity of the air. The temperature of the inside air stream upstream of the first heat exchanger is referred to as "actual" as it is measured or estimated.

In the method of the invention, the selection of the dehumidification mode is faster than in the known methods. The predetermined maps make it possible to select the appropriate dehumidification mode, or a dehumidification mode approaching it, more directly.

By examining selected data, namely the actual temperature of the inside air stream upstream of the first heat exchanger, the temperature setpoint downstream of the second heat exchanger, the temperature setpoint downstream of the first exchanger, the flow rate of said inside air stream through the first exchanger, the ambient temperature of the air and/or the humidity of the air, the applicant has been able to associate, in map form, a predefined dehumidification mode with each set of data used, while observing that the mode thus selected makes it possible to achieve or approach the desired results, without iterations or significantly minimizing the number of iterations, provided that at least three of these items of data are used. When the relevant data measured and/or fixed by setpoint are known, the time taken to select the required dehumidification mode is shortened in that the maps contain all of the data for selecting this dehumidification mode.

The method according to the invention therefore makes it possible to obtain the ambient temperature desired by the users more quickly and improves their comfort. It also requires less computing power compared with the known methods described above.

According to different features of the invention, which can be taken together or separately:

the maps of the parameters of the system are produced as a function of the actual temperature of the air stream upstream of the first heat exchanger, the temperature setpoint downstream of the second heat exchanger and one or more of the other humidity control parameters, referred to as additional parameters and/or other parameters making it possible to calculate or deduce these control parameters;

the one or more of said additional parameters is the temperature setpoint downstream of the first exchanger;

the one or more of said additional parameters is the air flow rate of the first heat exchanger;

the method comprises a prior step of determining a dehumidification configuration, said prior step being carried out as a function of the value of the ambient temperature;

the method comprises a mode change step during which the system switches from one of the modes for dehumidifying the inside air stream to another of the modes for dehumidifying the inside air stream, said mode change step being implemented after the step of selecting the dehumidification mode;

said mode change step is performed depending on whether a temperature threshold is reached by the temperature setpoint downstream of the second exchanger;

said mode change step is performed depending on whether a temperature threshold is reached by the temperature setpoint downstream of the first exchanger, the refrigerant circulation loop further comprises:

a third heat exchanger between the refrigerant and an outside air stream, said third exchanger being capable of acting selectively as an evaporator and/or a condenser for the refrigerant;

a compressor for the refrigerant;

the refrigerant loop operates selectively in at least one serial mode for dehumidifying the inside air stream in which said refrigerant circulates in succession, from the compressor, through a serial branch referred to as the serial condensation branch, comprising the second exchanger, a serial branch referred to as the intermediate serial branch, comprising the third exchanger, and a serial branch referred to as the serial evaporation branch, comprising the first exchanger, and at least one parallel mode for dehumidifying the inside air stream in which said refrigerant circulates in succession, from the compressor, in the condensation branch and then, from a junction, in a first parallel branch, referred to as the first parallel evaporation branch, comprising the third exchanger, acting as an evaporator and, in parallel, in a second parallel branch, referred to as the second parallel evaporation branch, comprising the first exchanger;

the refrigerant loop switches from a first of the serial modes for dehumidifying the inside air stream to a second of the serial modes for dehumidifying the inside air stream, or vice versa, when a first temperature threshold is reached by the temperature setpoint downstream of the second exchanger or by the temperature setpoint downstream of the first exchanger, the switch from the first to the second serial dehumidification mode varying the proportion of the inside air stream passing through the second exchanger;

the refrigerant loop switches from one of the serial modes for dehumidifying the inside air stream to a first of the parallel modes for dehumidifying the inside air stream, or vice versa, when a second temperature threshold is reached by the temperature setpoint downstream of the second exchanger or by the temperature setpoint downstream of the first exchanger;

the refrigerant loop switches from one of the parallel modes for dehumidifying the inside air stream to a second of the parallel modes for dehumidifying the inside air stream, or vice versa, when a third temperature threshold is reached by the temperature setpoint downstream of the second exchanger or by the temperature setpoint downstream of the first exchanger, a degree of opening of the first expansion member in said first parallel mode for dehumidifying the inside air stream being greater than a degree of opening of said first expansion member in the second parallel mode for dehumidifying the inside air stream, the switch from the first to the second parallel dehumidification mode varying the proportion of the refrigerant passing through the first exchanger.

BRIEF DESCRIPTION OF THE DRAWINGS

Further objects and features of the invention will become more clearly apparent from the following description, given with reference to the appended figures, in which.

DETAILED DESCRIPTION OF THE INVENTION

In order to make it easier to read the figures, elements that are identical bear the same reference signs. Some elements or parameters can be given ordinal numbers, in other words designated for example first element or second element, or first parameter and second parameter, etc. The purpose of this ordinal numbering is to make a distinction between elements or parameters that are similar but not identical. This ordinal numbering does not imply any priority of one element, or parameter, over another and the designations can be reversed.

In the description below, the expression "a first element upstream of a second element" means that the first element is placed before the second element with respect to the direction of circulation, or travel, of a fluid. Similarly, the expression "a first element downstream of a second element" means that the first element is placed after the second element with respect to the direction of circulation, or travel, of the fluid concerned.

The invention relates to a method for controlling a system for conditioning and/or heating an inside air stream FAI intended to be sent to a passenger compartment of a vehicle. The air conditioning system comprises a circulation loop 100 for a refrigerant FR. In this regard, the concept of upstream and downstream relating to the refrigerant should be understood in relation to the journey made in the loop by the refrigerant in a single cycle, starting from a compression device of the loop and returning to said compression device, before starting a new cycle.

An electronic control unit, not shown in the figures, receives information from sensors measuring the characteristics of the different fluids. The electronic control unit also receives setpoints issued by the occupants of the vehicle, such as the desired temperature inside the passenger compartment for example. The electronic control unit implements control laws for operating different actuators, in order to control the thermal conditioning system so as to achieve the setpoints received.

Various stop valves make it possible to permit or interrupt the circulation of refrigerant in different portions of the refrigerant circuit 100. It is thus possible, by combining the opening and closing of the different stop valves, to make the refrigerant circulate in branches of the circuit 100 according to multiple options that allow a number of types of heat exchange within the thermal conditioning system. If necessary, said valves are supplemented by non-return valves.

The inside air stream FAI is for example an air stream circulating in an air conditioning/heating unit 102 of the vehicle. It originates from an air inlet situated in particular at the bottom of the windshield of the vehicle. It is sent through an outlet to the passenger compartment of the vehicle. The refrigerant used is for example a chemical fluid such as R1234yf. Other refrigerants can also be used, such as R134a for example.

Figure 1:
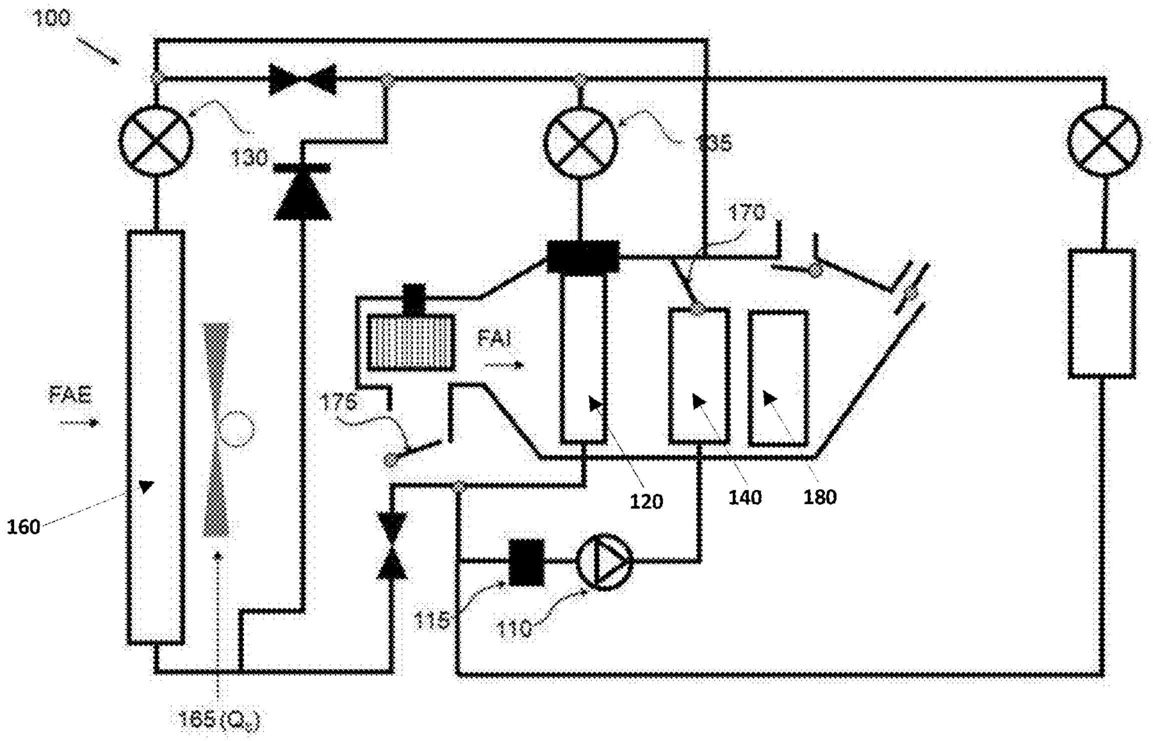
FIG. 1 is a schematic depiction of a refrigerant circulation loop making it possible to implement the control method according to the invention.

The loop 100 and the different elements thereof are illustrated according to one exemplary embodiment in FIG. 1. In this figure, the loop 100 is illustrated without showing the refrigerant circulation path in the loop or the state, for example open/closed, of certain elements thereof.

In this case, the circulation loop 100 for the refrigerant comprises:

- the compression device, made up of a compressor 110,
- a first heat exchanger 120 between the refrigerant FR and the inside air stream FAI for cooling said inside air stream,
- a second heat exchanger 140 between the refrigerant FR and the inside air stream FAI or a heat transfer fluid FC for heating said inside air stream, the second heat exchanger being situated downstream of the first heat exchanger 120 in the direction of circulation of the inside air stream,
- a third heat exchanger 160 between the refrigerant FR and an outside air stream FAE, said third exchanger 160 being capable of acting selectively as an evaporator and/or a condenser for the refrigerant;
- a first expansion member 130 situated between a first junction point EB1 and the third exchanger 160,
- a second expansion member 135 situated between a second junction point EB2 and the first exchanger 120,
- an accumulation device 115 situated between a third junction point EB3 and the compressor 110 for accumulating the circulating mass of refrigerant FR.

A heater 180, in particular an electric heater, situated downstream of the second exchanger 140 in the direction of circulation of the inside air stream FAI, can be provided in addition to the second exchanger for heating the inside air stream FAI.

The capacity for cooling the inside air stream FAI thus always comes at least partially from the first exchanger 120, while the capacity for heating said inside air stream FAI always comes at least partially from the second exchanger 140.

At this stage, it should be noted that in the case of an indirect architecture, the refrigerant FR is not directly used to perform heat exchanges with, in this instance, the second exchanger 140. In this regard, the heat exchanges can be implemented by means of an intermediate fluid referred to as heat transfer fluid FC. As a variant, the second exchanger 140 can therefore be a heat exchanger between the refrigerant FR and glycol water, with the glycol water then acting as the heat transfer fluid.

The outside air stream FAE is for example an air stream passing through a vehicle front face, in particular a radiator grille of the vehicle.

In light of these considerations, the loop illustrated in FIG. 1 can be used, inter alia, in five configurations described hereinafter with reference to FIGS. 1 to 3.

Figure 2A:
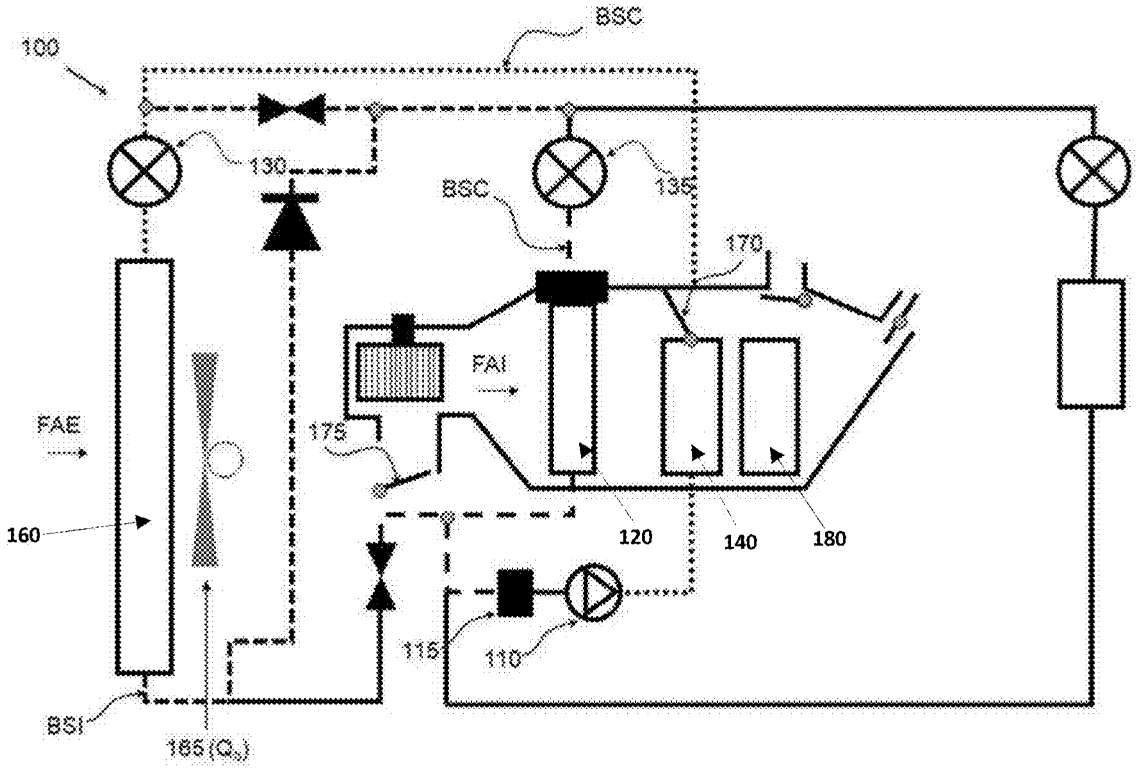
FIG. 2A is a schematic depiction of the refrigerant circulation loop in FIG. 1 in a configuration allowing operation in a first serial dehumidification mode.

With reference to FIG. 2A, the operating principle of the loop when it is in a mode referred to as serial mode for dehumidifying the inside air stream FAI will now be described.

The loop 100 comprises in succession, starting from the compressor 110, a serial condensation branch BSC identified by a closely-spaced dashed line, an intermediate serial branch BSI identified by a less closely-spaced dashed line than the serial condensation branch BSC and a serial evaporation branch BSE identified by a less closely-spaced dashed line than the intermediate serial branch BSI. The serial condensation branch BSC comprises, from upstream to downstream, the second exchanger 140 and the first expansion member 130. The third exchanger 160 is at the interface between the serial condensation branch BSC and the intermediate serial branch BSI. The second expansion member 135 is situated at the interface between the intermediate serial branch and the serial evaporation branch BSE. The serial evaporation branch BSE comprises, from upstream to downstream, the first exchanger 120 and the accumulation device 115. Finally, the compressor 110 is situated at the interface between the serial evaporation branch BSE and the serial condensation branch BSC.

As stated previously, the third exchanger 160 is capable of acting selectively as an evaporator and/or a condenser for the refrigerant FR. In this configuration, the first expansion member 130 has an appropriate degree of opening ExV1 so that the third exchanger 160 acts as a condenser, in this instance when the first expansion member 130 is fully open or partially open, so that the refrigerant FR undergoes little or no expansion and the third exchanger 160 reaches its maximum condensing capacity.

In the compressor 110, the refrigerant FR goes from a low-pressure gaseous state to a high-pressure gaseous state. It then passes through the second exchanger 140, where it partially condenses. Part of said refrigerant remains in gaseous form while the other part of the refrigerant returns to liquid form. The heat released by the partial condensation of the refrigerant heats the inside air stream FAI passing through the second exchanger 140.

Having passed through the first expansion member 130, arranged open and inactive or partially active, the refrigerant reaches the third exchanger 160, in which it continues to condense. Part of the refrigerant FR thus liquefies in the third exchanger 160 and leaves said third exchanger 160 in essentially liquid form. The heat released by the refrigerant FR in the third exchanger 160 is dispersed by the air stream FAE outside the vehicle by means of said third exchanger 160, preferably assisted by a fan 165 generating an air flow rate Qb of the outside air stream FAE.

The refrigerant then undergoes expansion by passing through the second expansion member 135, which is active. As a result, the refrigerant undergoes expansion before it passes through the first exchanger 120. It should be noted that a greater quantity of refrigerant FR is in liquid form at the inlet of the first exchanger 120 than in the absence of condensing in the third exchanger 160. As a result, more energy is required for the refrigerant FR to be evaporated in the first exchanger 120 and it therefore also absorbs more heat when passing through said first exchanger 120. Due to the evaporation of said refrigerant, the inside air stream FAI is cooled and dried. In this configuration, the inside air stream FAI is therefore successively cooled and dried in the first exchanger 120 and then heated in the second exchanger 140. This configuration corresponds to a second serial dehumidification mode, called DEHUM2 within the scope of the present invention.

That being said, it is possible to provide an inside air stream FAI having a lower temperature. In this regard, the circulation loop 100 can advantageously comprise a diversion element 170, such as a mixing flap, capable of moving from a closed state, in which said diversion element 170 lets the inside air stream FAI pass through the second exchanger 140, to an open state, in which said diversion element 170 diverts at least part of the inside air stream FAI from the second exchanger 140. Said mixing flap 170 is situated for example in said air conditioning unit 102.

Figure 2B:
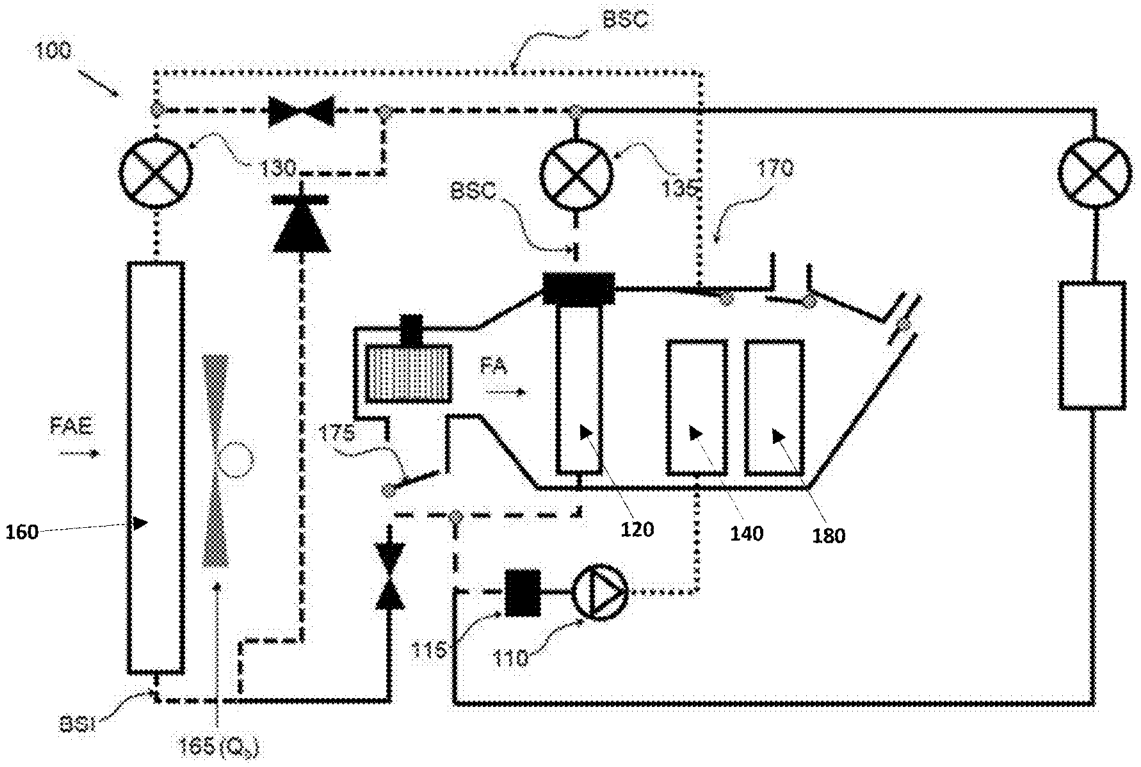
FIG. 2B is a schematic depiction of the refrigerant circulation loop in FIG. 1 in a configuration allowing operation in a second serial dehumidification mode.

When the loop 100 is in the serial dehumidification configuration and the diversion element 170 is open, as illustrated in FIG. 2B, the inside air stream FAI retains a cooler temperature. Having been cooled by the first exchanger 120, the inside air stream FAI does not pass through the second exchanger 140 and goes directly into the passenger compartment of the vehicle. It does not therefore capture the heat released by the condensing of the refrigerant in this exchanger. This configuration of the loop 100 corresponds to a first serial dehumidification mode, called DEHUM1 within the scope of the present invention. It operates in a similar way to an air conditioning mode, that is, in this particular configuration the expansion member 130 is open.

Like in DEHUM2 mode, in DEHUM1 mode the refrigerant FR leaves the first exchanger 120 in low-pressure gas form. It then passes through the accumulation device 115 before returning to the compressor 110 for a new cycle.

Figure 3:
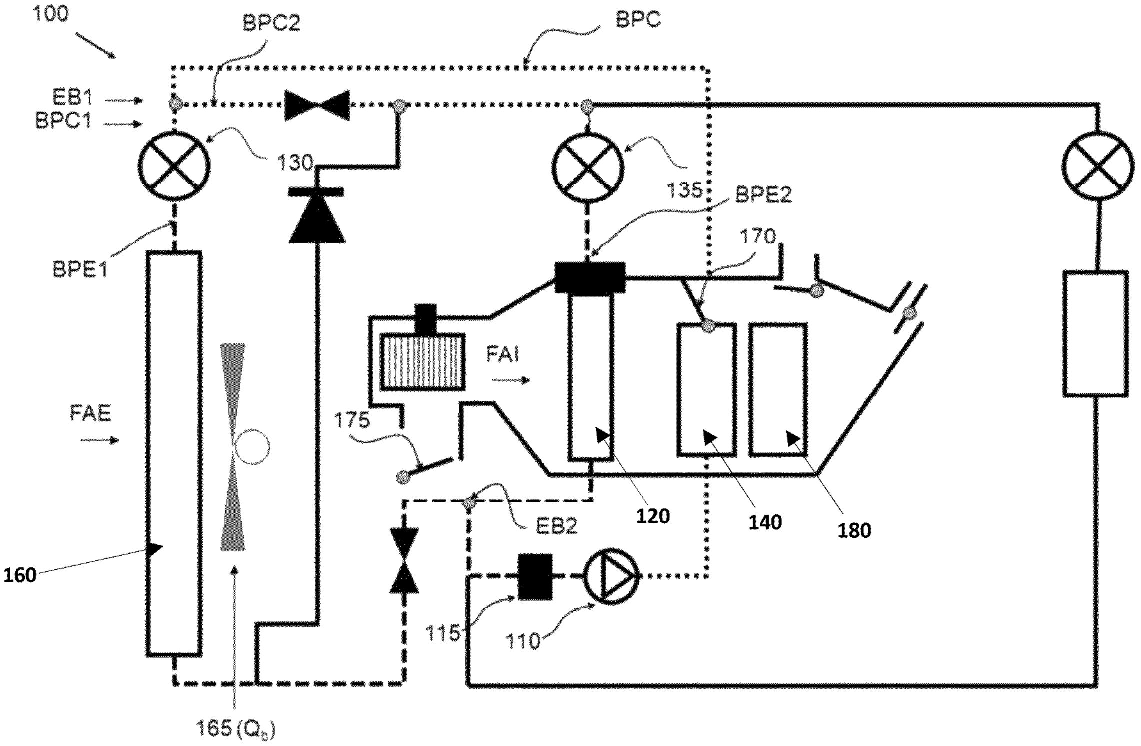
FIG. 3 is a schematic depiction of the refrigerant circulation loop in FIG. 1 in a configuration allowing operation in parallel dehumidification mode.

With reference now to FIG. 3, the operating principle of the loop 100 when it is in a mode referred to as parallel mode for dehumidifying the inside air stream FAI will now be described.

The loop 100 comprises in succession, starting from the compressor 110, a condensation branch BPC identified by a closely-spaced dashed line, and then from the first junction point EB1, the condensation branch BPC is split into two portions. A first portion BPC1 emerges in the first expansion member 130 while a second portion BPC2 emerges in the second expansion member 135. The second exchanger 140 is situated upstream of the first junction point EB1 on the condensation branch. The loop 100 comprises a first parallel evaporation branch, referred to as the first parallel branch BPE1, identified by a less closely-spaced dashed line than the condensation branch BPC and, in parallel, a second parallel evaporation branch, referred to as the second parallel branch BPE2, also identified by a less closely-spaced dashed line than the condensation branch BPC. According to this configuration, the first expansion member 130 is therefore at the interface between the first portion BPC1 of the condensation branch and the first parallel branch BPE1, while the second expansion member 135 is at the interface between the second portion BPC2 of the condensation branch and the second parallel branch BPE2. The first parallel branch BPE1 comprises the third exchanger 160. The second parallel branch BPE2 comprises the first exchanger 120.

Like in the dehumidification modes DEHUM1, DEHUM2, the refrigerant FR leaves the compressor 110 in high-pressure gas form, then returns to an essentially liquid form at the outlet of the second exchanger 140 by means of a condensation phenomenon inside said second exchanger 140.

The refrigerant FR is then separated starting from the junction EB1. Part of the refrigerant takes the first parallel branch BPE1 while the other part of the refrigerant takes the second parallel branch BPE2. Unlike in the serial dehumidification modes DEHUM1, DEHUM2, the first expansion member 130 is active in this configuration, so that the refrigerant undergoes evaporation when it passes through the third exchanger 160. The refrigerant FR is thus taken from an essentially liquid form in the first portion of the condensation branch BPC1 to a low-pressure gas form in the first parallel branch BPE1. The refrigerant FR therefore stores heat in the third exchanger 160.

By taking the second parallel evaporation branch BPE2, the refrigerant FR first passes through the second expansion member 135 where it undergoes expansion. It then undergoes evaporation by passing through the first exchanger 120 and is then in the form of a low-pressure gas at the outlet of said first exchanger 120. During this change of state, the refrigerant FR therefore stores heat, causing in parallel the cooling and drying of the inside air stream FAI in the first exchanger 120.

This configuration corresponds to a first parallel dehumidification mode, called DEHUM3 within the scope of the present invention. This configuration makes it possible to capture the energy situated in the third exchanger 160 so that it supplements the energy captured in the first exchanger 120. The sum of the energy thus captured, increased by the energy from the compressor 110, makes it possible to heat the inside air stream FAI in the second exchanger 140. In principle, the inside air stream will be cooled as much as in the dehumidification modes DEHUM1 and DEHUM2 described above. However, the air leaving the exchanger 140 will be heated more than in air stream dehumidification modes DEHUM1 and DEHUM2.

It should be noted that the refrigerant FR coming from said first BPE1 and second BPE2 parallel branches converges on a third junction point EB3 and then passes through the accumulation device 115 before returning to the compressor 110, and then the same process recommences.

It is possible to heat the inside air stream FAI even further by varying the air flow rate Qb of the outside air stream downstream of the third exchanger 160 by means of the fan 165. As mentioned above, with reference to FIG. 3, the refrigerant FR circulating in the first parallel branch BPE1 is heated in the third exchanger 160 by absorbing heat from the immediate environment of said third exchanger 160. As the capacity of the refrigerant FR to capture heat in the third exchanger 160 depends greatly on the air flow rate Qb of the outside air stream downstream of the third exchanger 160, the heat released downstream of the second exchanger 140 is necessarily affected by this. This configuration causing even greater heating of the inside air stream FAI makes it possible to operate in a second parallel dehumidification mode, called DEHUM4 within the scope of the present invention.

It is also possible to further heat the inside air stream FAI by increasing or decreasing the degree of opening ExV1 of the first expansion member 130 relative to the degree of opening ExV2 of the second expansion member 135. This is a control parameter particularly taken into account in dehumidification mode DEHUM4.

It should also be noted that the third exchanger 160 can be unused. This occurs in particular when the inside air stream FAI has a relative humidity that corresponds to the humidity desired in the passenger compartment of the vehicle. When the third exchanger 160 is not used, the system goes into a steady operating state, with the capacity for heating the inside air stream FAI corresponding to the capacity for heating the inside air stream using the second exchanger 140 while the capacity for cooling the inside air stream FAI corresponds to the capacity for cooling the inside air stream using the first exchanger 120. This configuration is associated with a steady state dehumidification mode called DEHUMSS. The temperature to which the inside air stream is heated by the second exchanger 140 can be modified independently by adjusting the temperature setpoint Tinnercd_sp downstream of the second heat exchanger 140. The temperature to which the inside air stream FAI is cooled can be modified independently by varying the temperature setpoint Tevap_sp downstream of the first exchanger 120.

As already stated, an accumulation device 115 can also be provided in order to accumulate the circulating mass of refrigerant FR in a low-pressure zone of the circuit. Alternatively, the first exchanger 120 can be provided with a receiver situated in a high-pressure zone of the circuit.

In summary, the loop 100 can therefore operate in at least five possible dehumidification configurations:

- a first serial dehumidification mode configuration in which there is little or no heat exchange between the refrigerant and the inside air stream in the second exchanger 140, in particular taking into account the position of the mixing flap of the air conditioning unit. Hereinafter, this dehumidification mode is called DEHUM1.
- a second serial dehumidification mode configuration in which there is significant heat exchange between the refrigerant and the inside air stream in the second exchanger 140, in particular taking into account the position of the mixing flap of the air conditioning unit and the expansion in the first expansion member 130. Hereinafter, this dehumidification mode is called DEHUM2.
- a third parallel dehumidification mode configuration in which the third exchanger 160 is passed through by a limited refrigerant FR flow rate and an outside air stream corresponding to an air flow rate Qb1 below a certain limit. Hereinafter, this dehumidification mode is called DEHUM3.
- a fourth parallel dehumidification mode configuration in which the third exchanger is passed through by an outside air stream corresponding to a forced air stream and/or having an air flow rate Qb2 above a certain limit so that the refrigerant FR flow rate is higher than in dehumidification mode DEHUM3. Hereinafter, this dehumidification mode is called DEHUM4.
- a fifth configuration corresponding to the configuration in which the third exchanger 160 is not used. Hereinafter, this dehumidification mode is called DEHUMSS.

Figure 4:
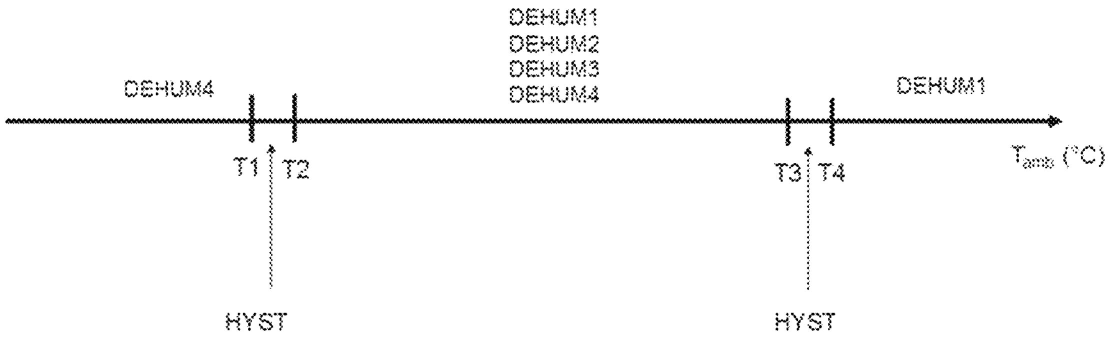
FIG. 4 is a graph schematically depicting the different dehumidification modes that can be selected depending on the ambient temperature.

The dehumidification modes that can be selected as a function of the ambient temperature Tamb in the passenger compartment of the vehicle are illustrated in FIG. 4. Temperatures T1, T2, T3 and T4 are such that T1≤T2≤T3≤T4. As illustrated, for Tamb≤T1, where T1 corresponds for example to an ambient temperature of −2° C., only mode DEHUM4 is used, in order to heat the passenger compartment. For Tamb≥T4, where T4 corresponds for example to an ambient temperature of 25° C. in the passenger compartment of the vehicle, only mode DEHUM1 is used, in order to cool the passenger compartment. When the temperature Tamb is between T1 and T2, and T3 and T4 respectively, a hysteresis phenomenon can be observed. Between T2 and T3, the ambient temperature Tamb is situated in a range in which all of the dehumidification modes can be selected.

The method according to the invention can comprise a prior step 20 of determining a dehumidification configuration as a function of the ambient temperature Tamb. This prior step makes it possible to determine whether a choice must be made from a plurality of dehumidification modes. The next step 30 of selecting a mode for dehumidifying the inside air stream only has a practical use in the event that as a result of this prior step 20, it has been determined that a choice of dehumidification modes is appropriate in the current configuration, for example in the event that the ambient temperature is between T2 and T3, or even between T1 and T4.

According to the invention, the method comprises at least one step 30 of selecting the mode for dehumidifying the inside air stream FAI from a plurality of dehumidification modes, said selection step 30 being implemented on the basis of maps, produced in advance, of at least three parameters of the system, referred to as humidity control parameters, selected from an actual temperature Tair_Hvac_in of the inside air stream FAI upstream of the first heat exchanger 120, the temperature setpoint Tinnercd_sp downstream of the second heat exchanger 140, the temperature setpoint Tevap_sp downstream of the first exchanger 120, the flow rate Q of said inside air stream through the first exchanger, an ambient temperature Tamb of the air and/or a humidity of the air Hair.

The aforementioned maps, of at least three of the humidity control parameters, are produced in advance and stored in the electronic control unit. They make it possible to distinguish accurately between the limiting conditions in which the different dehumidification modes described above, i.e. DEHUM1, DEHUM2, DEHUM3 and/or DEHUM4, can be operated, and thus make it possible to reflect the actual conditions in which the refrigerant circulation loop 100 must be operated in order to limit the humidity and reach the desired temperature in the passenger compartment of the vehicle.

The reliability of the selection made during step 30 depends on the number of maps produced. The number of maps that must be produced for the system to be reliable depends on the humidity control parameters as a function of which the maps are produced. In this regard, a plurality of maps can be necessary.

Once these maps have been produced, the system is able to select and, if necessary, switch to the appropriate dehumidification mode out of DEHUM1, DEHUM2, DEHUM3, DEHUM4 and/or DEHUMSS as a function of the limiting conditions of the humidity control parameters measured and/or calculated by said system. It is therefore no longer necessary to determine in real time which parameters or ranges of parameters are required in order to enter the configuration associated with the appropriate dehumidification mode. This applies each time a difference is observed relative to the desired humidity. In other words, at the moment of selecting the dehumidification mode and if a plurality of dehumidification modes are available, the system already has all of the data required to make this change quickly without having to calculate in real time the required values of the different humidity control parameters.

Figure 5:
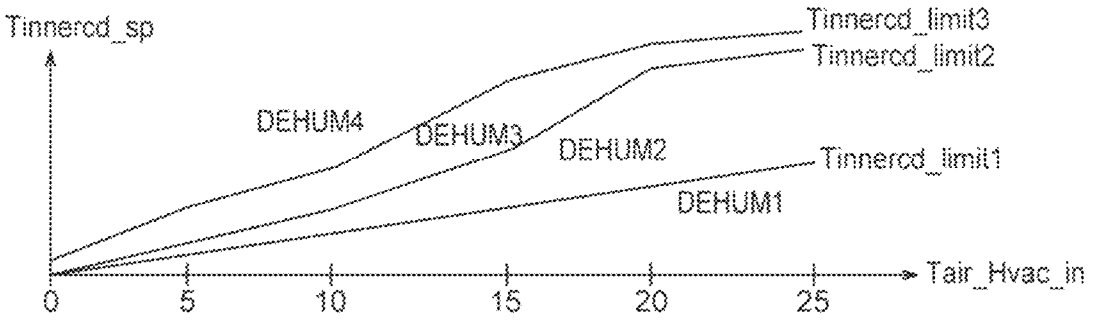
FIG. 5 shows a map of the different dehumidification modes that can be selected in a preferred embodiment of the present invention, FIGS. 6*a*, 6*b* and 6*c* partially reproduce FIG. 5 in order to show the change in a first, second and third temperature setpoint threshold downstream of the second heat exchanger as a function of a temperature setpoint downstream of the first heat exchanger.

FIG. 5 shows an example of a map of a first embodiment of the present invention. In the embodiment in question, the maps of the parameters of the system are produced as a function of the actual temperature Tair_Hvac_in of the air stream upstream of the first heat exchanger 120, the temperature setpoint Tinnercd_sp downstream of the second heat exchanger 140 and one or more of the other humidity control parameters, referred to as additional parameters. As a variant, these can also be other parameters making it possible to calculate or deduce these humidity control parameters.

In this embodiment, the ranges and limiting conditions of the humidity control parameters associated with each dehumidification mode are defined by vectors with n dimensions such as triplets {Tinnered_spi; Tair_Hvac_ini; additional humidity control parameter}. For the sake of simplicity, the invention is limited to triplets, although a person skilled in the art will understand that the implementation of the method is not limited to the 3D maps characterized by data triplets, and that it can also be implemented by means of 4D, 5D maps, etc., characterized by quadruplets, quintuplets, etc., of humidity control parameters.

The inventors of the present invention have highlighted the existence of temperature thresholds that must be reached by the temperature setpoint Tinnercd_sp downstream of the second exchanger 140 in order to allow the switch from one dehumidification mode DEHUM1, DEHUM2, DEHUM3 and DEHUM4 to another of said dehumidification modes. A first temperature threshold Tinnercd_limit1 of the temperature setpoint Tinnercd_sp downstream of the second exchanger 140 thus exists, defining the boundary between the operating conditions of the first and second serial dehumidification modes DEHUM1 and DEHUM2. Similarly, temperature thresholds Tinnercd_limit2 and Tinnercd_limit3 respectively mark a boundary between the operating conditions of the second serial dehumidification mode DEHUM2 and the first parallel mode DEHUM3 for dehumidifying the inside air stream and between the first and second parallel dehumidification modes DEHUM3 and DEHUM4. The concept of a temperature threshold is only real between two successive dehumidification modes, that is, between two dehumidification modes for which one of the two dehumidification modes is associated with similar triplets to the other of the two dehumidification modes. There is not a single temperature threshold that must be reached by the temperature setpoint Tinnercd_sp downstream of the second exchanger 140 in order to allow the switch from dehumidification mode DEHUM1 to dehumidification mode DEHUM3 or DEHUM4 and vice versa, but a plurality of temperature thresholds, in this instance at least Tinnercd_limit1 and Tinnercd_limit2. The same applies for switching from dehumidification mode DEHUM2 to DEHUM4, or vice versa, etc.

As a variant, temperature thresholds can be reached by the temperature setpoint Tevap_sp downstream of the first exchanger 120 in order to allow the switch from one of the dehumidification modes DEHUM1, DEHUM2, DEHUM3 and DEHUM4 to another of said dehumidification modes.

That being said, although the above incorrectly refers to temperature thresholds, it is indeed threshold conditions defined by triplets at the limits, i.e. {Tinnercd_spi=[Tinnercd_limit1, Tinnercd_limit2, Tinnercd_limit3]; Tair_Hvac_ini; additional humidity control parameter(s)} that make it possible to distinguish between the desired conditions in each of the dehumidification modes. The operating conditions of the loop 100 for each dehumidification mode are thus identified.

Figure 6A:
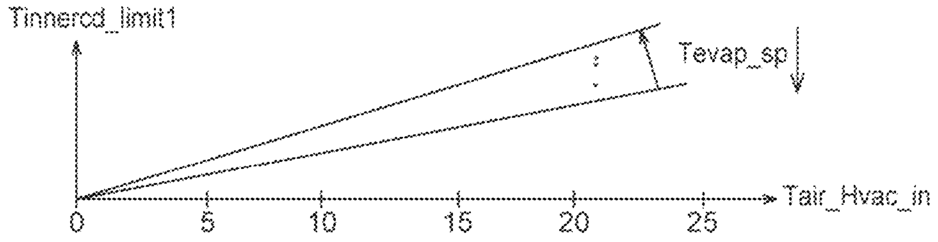
Figure 6B:
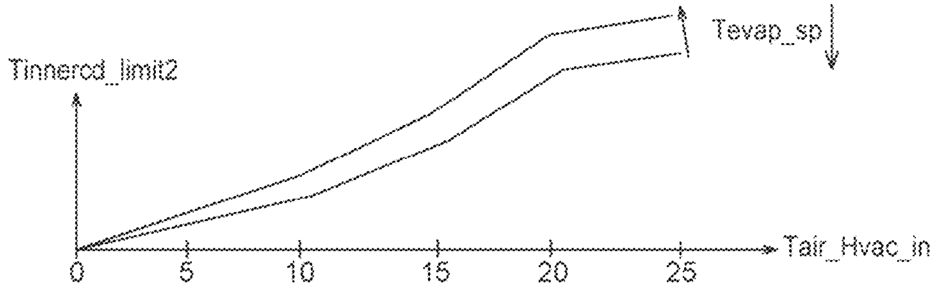
Figure 6C:
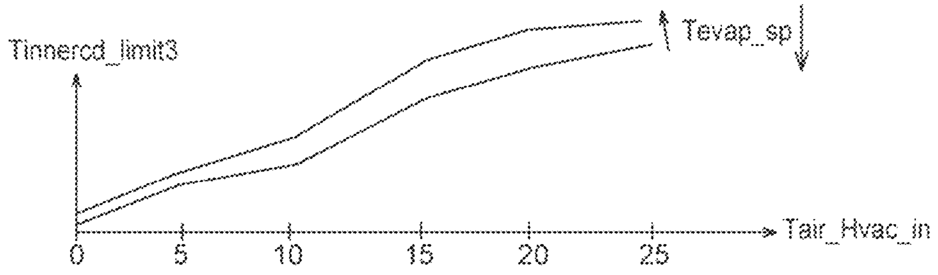

Still within the scope of this embodiment, the one or more of said additional parameters can advantageously be the temperature setpoint Tevap_sp downstream of the first exchanger 120. FIGS. 6*a*, 6*b* and 6*c* illustrate the change in the limiting conditions, in particular the temperature thresholds Tinnercd_limit1, Tinnered_limit2 and Tinnercd_limit3 respectively as a function of the temperature setpoint Tinnercd_sp downstream of the second exchanger 140, the actual temperature Tair_Hvac_in of the air stream upstream of the first heat exchanger 120 and the temperature setpoint Tevap_sp downstream of the first exchanger 120.

These 2D maps make it possible to display more simply the change in the triplets at the limits {Tinnercd_spi=[Tinnercd_limit1, Tinnercd_limit2, Tinnercd_limit3]; Tair_Hvac_ini; additional humidity control parameter(s)} by showing the change in the temperature thresholds reached by the temperature setpoint Tinnercd_sp downstream of the second exchanger 140 or by the temperature setpoint Tevap_sp downstream of the first exchanger marking the switch from one dehumidification mode to another, and the change in the actual temperature Tair_Hvac_in of the inside air stream FAI upstream of the first heat exchanger 120. When the temperature setpoint Tevap_sp downstream of the first exchanger 120 decreases, the same trends are observed regardless of the temperature threshold Tinnercd_limit1, Tinnercd_limit2, Tinnercd_limit3:

- the humidity control temperature threshold Tinnercd_limit1, Tinnercd_limit2, Tinnercd_limit3 in question increases, and in parallel,
- the actual temperature Tair_Hvac_in of the inside air stream FAI upstream of the first heat exchanger 120 decreases slightly.

At this stage, the parameters making it possible to vary the different temperature thresholds Tinnercd_limit1, Tinnercd_limit2, Tinnercd_limit3 can certainly be specified.

The first temperature threshold Tinnercd_limit1 marking the transition between modes DEHUM1 and DEHUM2 essentially depends on the temperature setpoint Tevap_sp downstream of the first exchanger 120 and, to a lesser extent, on the air flow rate Qb of the outside air stream, i.e. the air flow rate Qb of the fan 165. It will be remembered that in the serial dehumidification modes DEHUM1 and DEHUM2, the extent to which the refrigerant FR must absorb heat in the first exchanger 120 and therefore cool the inside air stream FAI obviously depends on the temperature setpoint Tevap_sp downstream of said first exchanger 120. It also depends indirectly on the heat released by the refrigerant FR in the third exchanger 160, said heat release optionally being assisted by the air flow rate Qb of the fan 165. An increase in the heat released outside the passenger compartment of the vehicle makes it possible to cool the refrigerant FR accordingly.

The second temperature threshold Tinnercd_limit2 defining a boundary between the operating conditions of modes DEHUM2 and DEHUM3 depends solely on the temperature setpoint Tevap_sp downstream of the first exchanger 120. The air flow rate Qb of the fan 165 only has limited influence since, as seen above, in the first parallel dehumidification mode DEHUM3, it is the change in operating mode of the third exchanger 160 to act as an evaporator that will essentially affect the heat exchanges in the third exchanger 160. The air flow rate Qb of the outside air stream therefore has almost no influence on the second temperature threshold Tinnercd_limit2.

The third temperature threshold Tinnercd_limit3 marking the boundary between the operating conditions of modes DEHUM3 and DEHUM4 depends both on the temperature setpoint Tevap_sp downstream of the first exchanger 120 and the air flow rate Qb of the outside air stream. With regard to the temperature setpoint Tevap_sp downstream of the first exchanger, the above continues to apply. With regard to the air flow rate Qb of the outside air stream, it will be remembered that in order for the loop to switch to a suitable configuration making it possible to reach the second parallel dehumidification mode DEHUM4, the capacity of the refrigerant FR to capture heat in the third exchanger 160 is adjusted by varying the air flow rate Qb generated by the fan 165.

The air flow rate Qb of the outside air stream is therefore an additional parameter in the same way as the temperature setpoint Tevap_sp downstream of the first exchanger 120. Obviously, other humidity control parameters can be envisaged.

In each of the above scenarios, it will be understood that when the user adjusts the setpoints and causes, for example, a decrease in the temperature setpoint Tevap_sp downstream of said first exchanger 120, this increases the value of temperature thresholds Tinnercd_1, Tinnercd_2 and Tinnercd_3. Thus, for a given temperature Tair_hvac_in of the air stream upstream of the first heat exchanger 120, the system will switch less quickly from one dehumidification mode to the other as the temperature setpoint Tinnercd_sp downstream of the second exchanger 140 increases.

Figure 7:
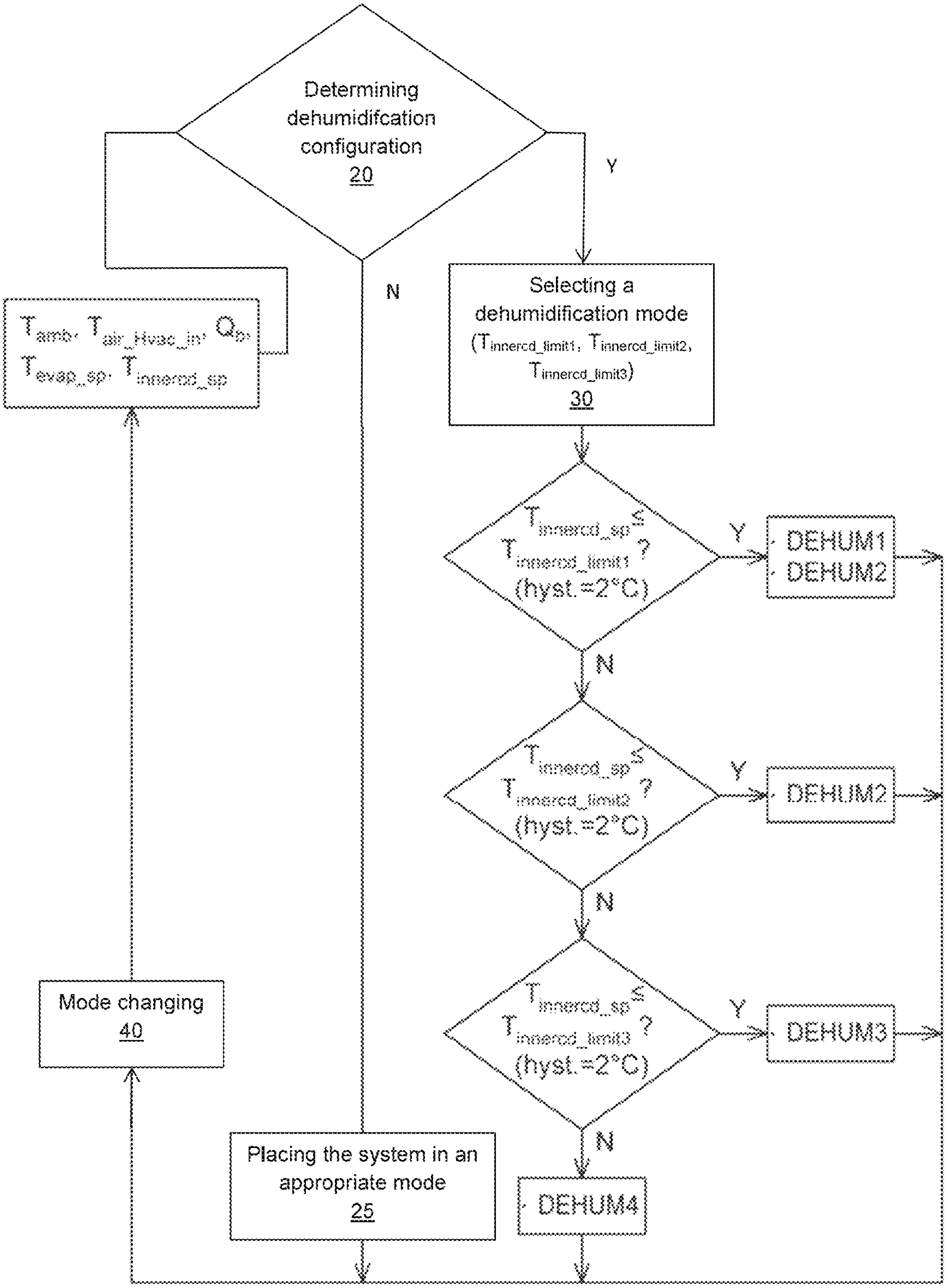
FIG. 7 is a schematic depiction of the algorithm for selecting the appropriate dehumidification mode according to the embodiment based on the map in FIG. 5.

With reference now to FIG. 7, an algorithm for selecting the dehumidification mode is schematically shown, still with respect to the embodiment shown in FIGS. 5, 6*a*, 6*b* and 6*c*.

The input data of the algorithm are the ambient temperature Tamb, the actual temperature Tair_Hvac_in of the air stream upstream of the first heat exchanger 120, the air flow rate Qb of the outside air stream, the temperature setpoint Tevap_sp downstream of the first exchanger 120, and the temperature setpoint Tinnercd_sp downstream of the second exchanger 140.

Initially it should be determined whether a selection must be made from the aforementioned dehumidification modes. As seen above, this takes place during the prior step 20 of determining a dehumidification configuration as a function of the ambient temperature Tamb. If a selection must not be made, the air conditioning/heating system is placed in the appropriate mode (step 25). If a selection must be made between the different dehumidification modes, the maps identifying the different temperature thresholds Tinnercd_limit1, Tinnercd_limit2 and Tinnercd_limit3 respectively of the temperature setpoint Tinnercd_sp downstream of the second exchanger 140 are used.

The algorithm then compares the temperature setpoint Tinnercd_sp downstream of the second exchanger 140 in succession with each of the temperature thresholds Tinnercd_limit1, Tinnercd_limit2 and Tinnercd_limit3, provided that it is below these temperatures, and then selects in step 30 the appropriate dehumidification mode as a function of the result of the comparison.

The method can comprise, following the step 30 of selecting a mode for dehumidifying the inside air stream FAI, a step 40 of changing mode during which the system switches from one of the modes DEHUM1, DEHUM2, DEHUM3, DEHUM4 and DEHUMSS for dehumidifying the inside air stream to another of the modes for dehumidifying the inside air stream, during a subsequent iteration of the algorithm. Such a mode change can particularly occur if one of the items of input data changes. The algorithm in FIG. 7 is executed in a loop at a frequency selected to provide the appropriate comfort in the passenger compartment.

Each of the expansion devices used is for example an electronic expansion valve, that is an expansion valve the refrigerant flow area of which can be adjusted continuously between a closed position and a fully open position. To this end, the control unit of the system controls an electric motor that moves a movable shut-off device controlling the flow area available to the refrigerant.

The compressor 110 can be an electric compressor, that is a compressor with moving parts driven by an electric motor. The compressor 110 comprises a suction side for low-pressure refrigerant, also called the inlet of the compressor, and a discharge side for high-pressure refrigerant, also called the outlet of the compressor. The internal moving parts of the compressor 110 take the refrigerant from low pressure on the inlet side to high pressure on the outlet side. After expansion in one or more expansion devices, the refrigerant returns to the inlet of the compressor 110 and begins a new thermodynamic cycle.

What is claimed is:

1. A method for controlling a system for air conditioning and/or heating an inside air stream intended to be sent to a passenger compartment of a vehicle, said system comprising a loop for the circulation of a refrigerant, said loop including:

a first heat exchanger between the refrigerant and the inside air stream for cooling said inside air stream, a second heat exchanger between the refrigerant and the inside air stream or a heat transfer fluid for heating said inside air stream, situated downstream of the first heat exchanger in the direction of circulation of the inside air stream, said method comprising selecting a mode for dehumidifying the inside air stream from a plurality of dehumidification modes, said selecting being implemented on the basis of maps, produced in advance, of at least three parameters of the system, referred to as humidity control parameters, selected from an actual temperature of the inside air stream upstream of the first heat exchanger, a temperature setpoint downstream of the second heat exchanger, a temperature setpoint downstream of the first heat exchanger, a flow rate of said inside air stream through the first exchanger, an ambient temperature of the air and a humidity of the air;

wherein the selecting step includes:

determining, from the maps produced in advance, a first temperature threshold, a second temperature threshold, and a third temperature threshold for the temperature setpoint downstream of the second heat exchanger; and comparing the temperature setpoint downstream of the second heat exchanger with the first, second, and third temperature thresholds to select the dehumidification mode from the plurality of dehumidification modes.

2. The method as claimed in claim 1, wherein the maps of the parameters of the system are produced as a function of the actual temperature of the air stream upstream of the first heat exchanger, the temperature setpoint downstream of the second heat exchanger and one or more of the other humidity control parameters, referred to as additional parameters and other parameters making it possible to calculate or deduce these control parameters.

3. The method as claimed in claim 2, wherein the one or more of said additional parameters is the temperature setpoint downstream of the first exchanger.

4. The method as claimed in claim 2, wherein the one or more of said additional parameters is the air flow rate in the first heat exchanger.

5. The method as claimed in claim 1, wherein the method further comprises prior determining a dehumidification configuration, said prior determining being carried out as a function of the value of the ambient temperature.

6. The method as claimed in claim 1, wherein the method further comprises mode changing during which the system switches from one of the modes for dehumidifying the inside air stream to another of the modes for dehumidifying the inside air stream, said mode changing being implemented after selecting the dehumidification mode.

7. The method as claimed in claim 6, wherein said mode changing is carried out depending on whether a temperature threshold is reached by the temperature setpoint downstream of the second exchanger or by the temperature setpoint downstream of the first exchanger.

8. The method as claimed in claim 1, wherein the loop includes:

a third heat exchanger between the refrigerant and an outside air stream, said third exchanger being capable of acting selectively as an evaporator and a condenser for the refrigerant, a compressor for the refrigerant.

9. The method as claimed in claim 8, wherein the loop is configured to operate selectively in at least one serial mode for dehumidifying the inside air stream in which said refrigerant circulates in succession, from the compressor, through a serial branch referred to as the serial condensation branch, including the second exchanger, a serial branch referred to as the intermediate serial branch, including the third exchanger, and a serial branch referred to as the serial evaporation branch, including the first exchanger, and at least one parallel mode for dehumidifying the inside air stream in which said refrigerant circulates in succession, from the compressor, in a condensation branch and then, from a junction, in a first parallel branch, referred to as the first parallel evaporation branch, including the third exchanger, acting as an evaporator and, in parallel, in a second parallel branch, referred to as the second parallel evaporation branch, including the first exchanger.

10. The method as claimed in claim 9, wherein the loop is configured to switch from a first serial mode for dehumidifying the inside air stream to a second of the serial modes for dehumidifying the inside air stream, or vice versa, when a first temperature threshold is reached by the temperature setpoint downstream of the second exchanger or by the temperature setpoint downstream of the first exchanger, the switch from the first to the second serial dehumidification mode varying the proportion of the inside air stream passing through the second exchanger.

11. The method as claimed in claim 9, wherein the loop is configured to switch from the at least one serial mode for dehumidifying the inside air stream to the at least one parallel mode for dehumidifying the inside air stream, or vice versa, when a second temperature threshold is reached by the temperature setpoint downstream of the second exchanger or by the temperature setpoint downstream of the first exchanger.

12. The method as claimed in claim 9, wherein the at least one parallel mode for dehumidifying the inside air stream includes a first parallel mode and a second parallel mode, wherein the loop is configured to switch from the first of the parallel modes for dehumidifying the inside air stream to the second of the parallel modes for dehumidifying the inside air stream, or vice versa, when a third temperature threshold is reached by the temperature setpoint downstream of the second exchanger or by the temperature setpoint downstream of the first exchanger, a degree of opening of the first expansion member in said first parallel mode for dehumidifying the inside air stream being greater than a degree of opening of said first expansion member in the second parallel mode for dehumidifying the inside air stream, the switch from the first to the second parallel dehumidification mode varying the proportion of the refrigerant passing through the first exchanger.

13. The method as claimed in claim 1, wherein the maps of the parameters of the system are produced as a function of the actual temperature of the air stream upstream of the first heat exchanger, the temperature setpoint downstream of the second heat exchanger and one or more of the other humidity control parameters, referred to as additional parameters or other parameters making it possible to calculate or deduce these control parameters.

14. The method of claim 1, wherein the system further comprises a physical diversion element positionable in an open state to divert at least a portion of the inside air stream away from the second heat exchanger and is positionable in a closed state to direct the inside air stream through the second heat exchanger.

15. A method for controlling a system for air conditioning and/or heating an inside air stream intended to be sent to a passenger compartment of a vehicle, said system comprising a loop for the circulation of refrigerant, said loop including:

a first heat exchanger between the refrigerant and the inside air stream for cooling said inside air stream, a second heat exchanger between the refrigerant and the inside air stream or a heat transfer fluid for heating said inside air stream, situated downstream of the first heat exchanger in the direction of circulation of the inside air stream, said method comprising selecting a mode for dehumidifying the inside air stream from a plurality of dehumidification modes, said selecting being implemented on the basis of maps, produced in advance, of at least three parameters of the system, referred to as humidity control parameters, selected from an actual temperature of the inside air stream upstream of the first heat exchanger, a temperature setpoint downstream of the second heat exchanger, a temperature setpoint downstream of the first exchanger, a flow rate of said inside air stream through the first exchanger, an ambient temperature of the air or a humidity of the air;

wherein the system further comprises a physical diversion element positionable in an open state to divert at least a portion of the inside air stream away from the second heat exchanger and is positionable in a closed state to direct the inside air stream through the second heat exchanger.

16. The method of claim 15, wherein the loop includes:

a third heat exchanger between the refrigerant and an outside air stream, said third exchanger being capable of acting selectively as an evaporator and a condenser for the refrigerant.

17. The method of claim 15, wherein the selecting step includes:

determining, from the maps produced in advance, a first temperature threshold, a second temperature threshold, and a third temperature threshold for the temperature setpoint downstream of the second heat exchanger; and comparing the temperature setpoint downstream of the second heat exchanger with the first, second, and third temperature thresholds to select the dehumidification mode from the plurality of dehumidification modes.

18. A method for controlling a system for air conditioning and/or heating an inside air stream intended to be sent to a passenger compartment of a vehicle, said system comprising a loop for the circulation of a refrigerant, said loop including:

a first heat exchanger between the refrigerant and the inside air stream, a second heat exchanger between the refrigerant and the inside air stream, situated downstream of the first heat exchanger in the direction of circulation of the inside air stream, said method comprising selecting a mode for dehumidifying the inside air stream from a plurality of dehumidification modes, said selecting being implemented on the basis of maps, produced in advance, of at least three parameters of the system, referred to as humidity control parameters, selected from an actual temperature of the inside air stream upstream of the first heat exchanger, a temperature setpoint downstream of the second heat exchanger, a temperature setpoint downstream of the first heat exchanger, a flow rate of said inside air stream through the first exchanger, an ambient temperature of the air and a humidity of the air;

wherein the system further comprises a physical diversion element positionable in an open state to divert at least a portion of the inside air stream away from the second heat exchanger.

19. The method of claim 18, wherein the physical diversion element is positionable in a closed state to direct the inside air stream through the second heat exchanger.

20. The method of claim 18, wherein the selecting step includes:

determining, from the maps produced in advance, a first temperature threshold, a second temperature threshold, and a third temperature threshold for the temperature setpoint downstream of the second heat exchanger; and comparing the temperature setpoint downstream of the second heat exchanger with the first, second, and third temperature thresholds to select the dehumidification mode from the plurality of dehumidification modes.

* * * * *